United States Patent

Higuchii

[11] Patent Number: 6,064,538
[45] Date of Patent: May 16, 2000

[54] BIASING/ERASING OSCILLATION CIRCUIT FOR MAGNETIC TAPE RECORDING APPARATUS

[75] Inventor: Yoshio Higuchii, Daito, Japan

[73] Assignee: Funai Electric Co., Ltd., Osaka, Japan

[21] Appl. No.: 09/024,771

[22] Filed: Feb. 17, 1998

[30] Foreign Application Priority Data

| Feb. 17, 1997 | [JP] | Japan | 9-031530 |
| Sep. 30, 1997 | [JP] | Japan | 9-265894 |
| Feb. 10, 1998 | [JP] | Japan | 10-028287 |

[51] Int. Cl.$^7$ ............................................. G11B 5/024
[52] U.S. Cl. ............................................................. 360/66
[58] Field of Search ............................. 360/66, 57, 118; 386/63

[56] References Cited

U.S. PATENT DOCUMENTS

| 3,812,529 | 5/1974 | Yoichi | 360/25 |
| 5,386,326 | 1/1995 | Harman | 360/46 X |
| 5,771,128 | 6/1998 | Lee | 360/57 |

FOREIGN PATENT DOCUMENTS

| 55-160340 | 12/1980 | Japan | 360/66 |
| 61-153102 | 9/1986 | Japan . | |

*Primary Examiner*—Alan T. Faber
*Attorney, Agent, or Firm*—Lackenbach Siegel Marzullo Aronson & Greenspan, P.C.

[57] ABSTRACT

A biasing/erasing oscillator includes a series circuit formed by an entire-width erasing head, a linear record erasing head and an inductor. The series circuit is connected in parallel with an oscillating capacitor to form an LC resonant circuit. The LC resonant circuit is connected to a base of a transistor through a direct current blocking capacitor. The transistor has an emitter is connected to a series junction point, for example, between a sound erasing head and the inductor. A collector of the transistor is supplied with a bias voltage, while the transistor base is supplied with a bias current through a bias resistor. The direct current blocking capacitor prevents the bias current from flowing into the LC resonant circuit.

6 Claims, 6 Drawing Sheets

BIASING/ERASING OSCILLATION CIRCUIT FOR MAGNETIC TAPE RECORDING APPARATUS

BACKGROUND OF THE INVENTION

1. Field of the Invention

This invention relates to a biasing/erasing oscillation circuit for magnetic tape recording apparatuses, and more particularly to a biasing/erasing oscillation circuit for VTRs which is adapted to provide an alternate current bias, for example, to a recording/reproducing head or supply to an erasing head a high frequency current for erasure.

2. Description of the Prior Art

Magnetic tape recording apparatuses, particularly VTR, are generally provided with a biasing/erasing oscillator for generating recording biases and/or erasing currents. Conventionally, the biasing/erasing oscillator of this kind uses an LC resonant circuit having a discrete inductor and capacitor connected in parallel therewith. Accordingly, the conventional oscillator is not only complicated in circuit structure but also expensive to produce.

Under such a situation, there has been disclosed an oscillation circuit for audio tape recorders by Japanese Laid-open Publication No. S61-153102 that has been laid open on Sep. 22, 1986, wherein an LC resonant circuit is configured by utilizing an inductance component of an erasing head instead of using a complicated oscillating transformer (inductor).

FIG. 1 shows a circuit diagram showing this conventional art, wherein the oscillation circuit for tape recorders is shown. The oscillation circuit is structured by an LC parallel resonant circuit formed by an erasing head EH having an inductance L1 and two capacitors C1 and C2 so that it cooperates with a 2-terminal inductor L0 to thereby control oscillating frequencies. In FIG. 1, there are further shown stereo sound recording heads RHR and RHL. These sound recording heads RHR and RHL are respectively connected to a right sound input terminal AR and a left sound input terminal AL.

The conventional art shown in FIG. 1 does not teach concrete values at all as to the resistors R1, R2 and R3 as well as the capacitors C0, C1, C2, C3 and C4, etc. for establishing required oscillating conditions. Moreover, since the conventional art is an oscillation circuit for audio tape recorders, the application of this conventional art to a VTR (VCR) requires setting on oscillating conditions necessitated for the VTR (VCR).

To cope with this, the present inventors conducted various experiments by using the FIG. 1 circuit in order to divert the conventional art of FIG. 1 to a VTR (VCR). VTR (VCR) biasing/erasing oscillators require a high frequency current of approximately 180–200 mA (RMS). Further, the impedance of the erasing head EH in the FIG. 1 circuit has been set at 80 Ω, because an entire-width erasing head generally used for VTR (VCR) possesses 80 Ω. Under these propositions, the values of the inductors, capacitors, etc., for establishing an optimal oscillating condition, have been set as C0=470 pF, C1=0.18 µF, C2=0.33 µF, L0=220 µH, R1=47 kΩ through calculations and a cut-and-try technique. Note that as a transistor TR was used "2SD734". A direct current power voltage +B of 8 V was applied to the circuit. As a result of this experiment, the transistor TR of the FIG. 1 circuit had a direct current as high as 144 mA flowing therethrough and accordingly the transistor TR was abnormally heated up where the FIG. 1 circuit is used for a VTR (VCR) biasing/erasing oscillator. It was found from the result of the experiment that the oscillator of the FIG. 1 circuit set with the above values is impossible to put into practical use.

The inventors then conducted a further experiment to apply a direct current power voltage+B of 5V to the FIG. 1 circuit set with the above respective values. In this case, the direct current flowing through the transistor TR was at 80 mA, thereby eliminating the abnormal heating up in the transistor TR. However, the erasing head EH with impedance of 80 Ω had a high frequency current as low as 140 mA (RMS). It was found in also this experiment that the FIG. 1 circuit cannot be employed as a VTR (VCR) biasing/erasing oscillator.

Another experiment was further conducted on an assumption of using two erasing heads, i.e. an entire-width erasing head and a sound erasing head. In this case, the series connection of the entire-width erasing head and the sound erasing head corresponds to the erasing head EH in the FIG. 1 circuit. In this experiment, the impedance of the entire-width erasing head (video erasing head) was set at 80 Ω and the impedance of the sound erasing head at 34 Ω with the capacitor value, etc. set at C0=470 pF, C1=0.18 µF, C2=0.027 µF, L0=220 µH, R1=47 kΩ. In this experiment, a direct current power voltage+B of 11 V was applied so as to allow a high frequency current of 200 mA to flow through the entire-width erasing head. The transistor TR had a direct current of as high as 280 mA flowing therethrough. Consequently, it was found also in this experiment that the conventional art of FIG. 1 is impossible to utilize for a VTR (VCR) biasing/erasing oscillator.

SUMMARY OF THE INVENTION

Therefore, it is a primary object of this invention to provide an inexpensive biasing/erasing oscillation circuit for magnetic tape recording apparatuses by the utilization of a magnetic head as an oscillating element.

A biasing/erasing oscillation circuit for magnetic tape recording apparatuses according to this invention having an entire-width erasing head for erasing signals recorded in an azimuth track, or the azimuth track and a linear track, of a magnetic tape, and a linear record erasing head for erasing signals recorded in the linear track of the magnetic tape, comprising: a series circuit connecting in series through a series junction point between at least one of the entire-width erasing head and the linear record erasing head and a inductance element: a oscillating capacitor connected in parallel with the series circuit; a transistor having a collector, base and an emitter connected to the series junction point; a direct current preventive capacitor connected between the one end of the series circuit and the base; and a bias resistor for given an bias voltage to the base.

The series circuit is configured in a first embodiment by the entire-width erasing head and the linear record erasing head, and in a second embodiment by the entire-width erasing head, the linear record erasing head and an inductor. An LC resonant circuit is formed by connecting the series circuit and the oscillating capacitor in parallel with each other. The LC resonant circuit is connected to the base of the transistor through the direct current preventive capacitor. The emitter of the transistor is connected, for example, to a series junction point between a sound erasing head and the inductor. Incidentally, the collector of the transistor is supplied with a bias voltage, while the base of the transistor is supplied with a bias current through the bias resistor. The direct current preventive capacitor prevents this bias current from flowing into the LC resonant circuit.

Part of the high frequency current flowing through the LC resonant circuit is supplied to the base of the transistor through the direct current preventive capacitor. Consequently, the transistor is driven to provide an oscillating state in the LC resonant circuit. At this time, the transistor emitter current in the first embodiment flows through at least one of the entire-width erasing head and the linear record erasing head, while it, in the second embodiment, flows only through the inductor.

If the series circuit is configured, according to this invention, by the entire-width erasing head and the linear record erasing head so that the series circuit is connected with the oscillating capacitor in parallel therewith, there is no necessity of employing an especial inductance element.

Meanwhile, if the series circuit is configured by the entire-width erasing head, the linear record erasing head and the inductor so that the series circuit is connected with the oscillating capacitor with each other, a direct current is prevented from flowing through the entire-width erasing head and/or the linear record erasing head constituting, by the inductor, the series circuit to thereby prevent against occurrence of distortions in the erasing current.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6(A) is a graph representing a variation, against time T, of the voltage $V_O$ and the erasing current I11 given to an LC resonant circuit, while FIG. 6(B) is a graph showing a variation, against time T, of the voltage $V_P$ at a point P and the voltage $V_Q$ at a point Q when the erasing current I11 is flowing.

DETAILED DESCRIPTION OF THE PREFERRED EMBODIMENT

Figure 1:
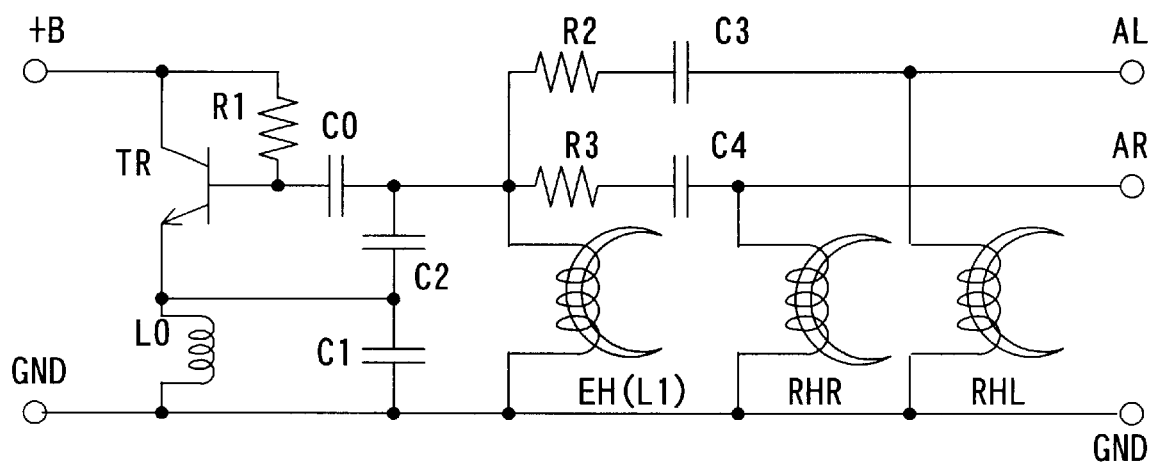
FIG. 1 is a circuit diagram showing a conventional oscillation circuit for audio tape recorders.
Figure 2:
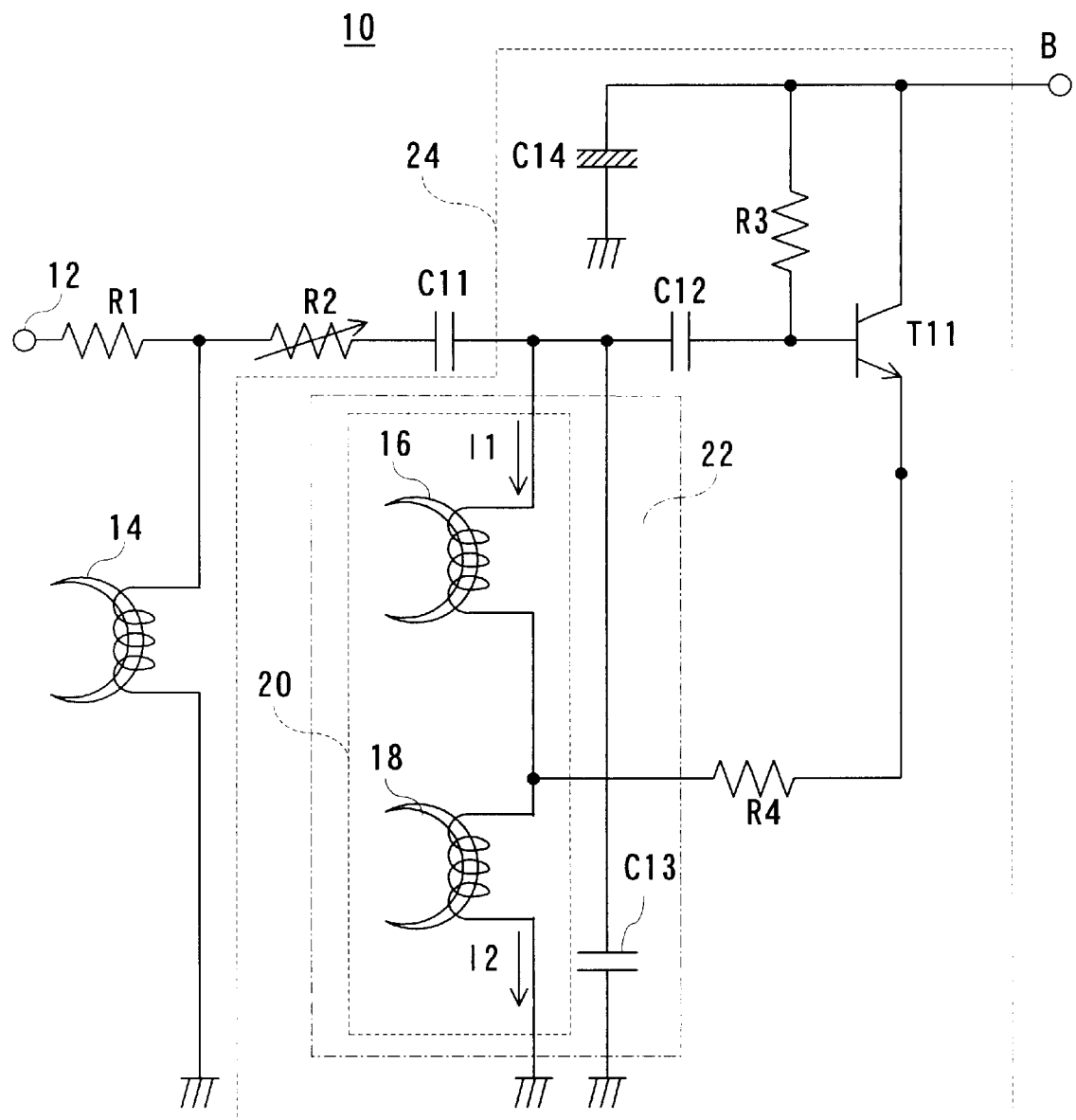
FIG. 2 is a circuit diagram showing an oscillation circuit for VTR according to one embodiment of this invention.
Figure 3:
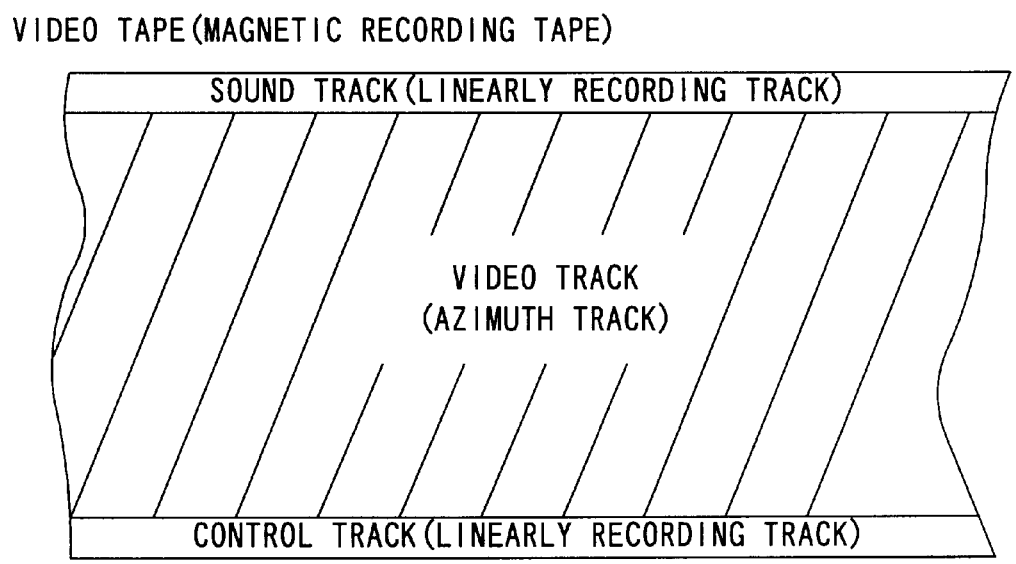
FIG. 3 is an illustrated diagram showing a video tape.

A biasing/erasing oscillation circuit 10 for VTR as an embodiment as illustrated in FIG. 2 includes a terminal 12, wherein the terminal 12 is connected to one end of a resistor R1. The resistor R1 has the other end connected to one end of a varistor R2 so that the resistor R1 and the varistor R2 have a junction point that is grounded through a video recording and reproducing head 14. The video recording and reproducing head 14 records video signals on a video track as shown in FIG. 3, and reproduces the video signal recorded on the video track. The other end of the varistor R2 is connected to one end of a direct-current blocking capacitor C12 through a capacitor C11. The junction point between the capacitor C11 and the capacitor C12 is connected to a series circuit 20 formed by an entire-width erasing head 16 and a linear erasing head 18. Incidentally, the junction point between the capacitor C11 and the capacitor C12 is con-nected to one end of the series circuit 20, i.e. one end of the entire-width erasing head 16, while the other end of the series circuit 20, i.e. one end of the linear erasing head 18, is grounded. The junction point between the capacitor C11 and the capacitor C12 is also connected to one end of an oscillating capacitor 13, with the other end thereof is grounded. In this manner, an LC resonant circuit 22 is formed by connecting the series circuit 20 and the capacitor C13 in parallel with each other.

The other end of the capacitor C12 is connected to a base of a transistor T11 so that the capacitor C12 and the base of the transistor T11 have a junction point therebetween to which one end of a resistor R3 is connected. The other end of the resistor R3 is connected to a bias B. The bias B is also connected to a collector of the transistor T11 and also to one end of a capacitor C14. The other end of the capacitor C14 is grounded. The transistor T11 has an emitter connected to one end of a resistor R4, while the other end of the resistor R4 is connected to a series junction point between the sound erasing head 18 and an inductor L1.

In this embodiment, the bias B is supplied with a direct current power of 5 V, wherein an impedance given of 80 Ω (measuring current 10 mA) at 70 kHz is employed for the entire-width erasing head 16 while an impedance given of 34 Ω (measuring current 10 mA) at 70 kHz is used for a sound erasing head 18. The capacitor C12 is 470 pF, and the capacitor C13 is 0.018 μF. The resistor R3 uses is 47 kΩ, and the resistor R4 uses is 1 Ω (oscillation strength adjusting resistor).

Part of the high frequency current flowing through the LC resonant circuit 22 is positively fed back to the base of the transistor T11 via the capacitor C12. This causes the transistor T11 to be driven to provide an oscillating state continuously in the oscillation circuit 24. Where erasing a recorded signal from a video tape shown in FIG. 3, the high frequency currents I1 and I2 respectively flow through the entire-width erasing head 16 and the sound erasing head 18 so that the entire-width erasing head 16 and the sound erasing head 18 can exert intense alternate current magnetic fields, respectively, through a video track and an audio track on the video tape. Here, a video track shown in FIG. 3 is an azimuth track, while a sound track is a linear recording track. Note that the linear recording track includes, besides the sound track, a control track for recording thereon control signals.

Where recording a signal onto a video tape, a high frequency current I1 is supplied as an alternate current bias to the video recording and reproducing head 14 from the oscillation circuit 24 through the capacitor C11 and the resistor R2. Consequently, the signal current, that is inputted from the terminal 12 through the resistor R1, is superposed over by the alternate current bias (bias current) and recorded onto the video tape.

In the FIG. 2 embodiment, there was no necessity of separately providing an exclusive element (oscillating transformer) for oscillation because the coils wound around the respective cores of the entire-width erasing head 16 and the sound erasing head 18 are utilized as an inductance for the oscillation circuit 24. Therefore, the cost is reduced.

Figure 4:
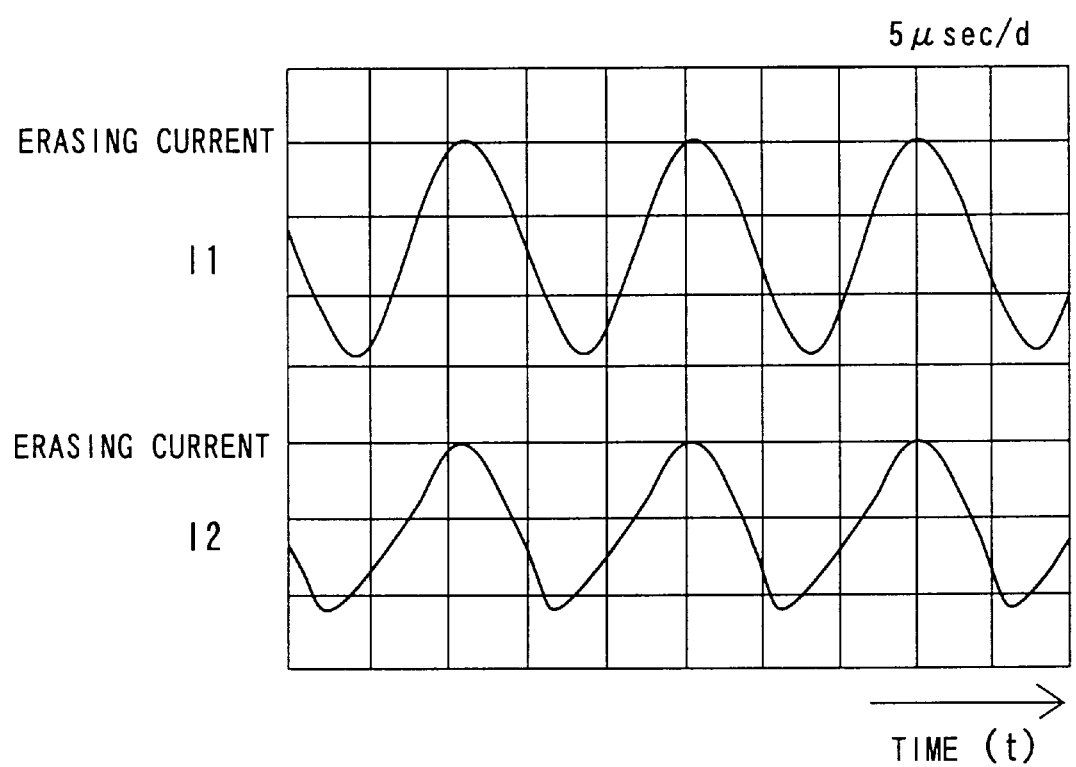
FIG. 4 is a graph showing a variation, against time T, of erasing currents I1 and I2 flowing through an entire-width erasing head and a sound erasing head in the FIG. 2 embodiment.

In the FIG. 2 embodiment, however, there may arise a problem of distortions in the erasing current. More specifically, the emitter current in the transistor T1 contains a direct current component, which causes distortions in the erasing current I2 as shown in FIG. 4. In this case, when erasing a sound signal recorded on the magnetic tape, the magnetic tape is given a direct current bias so that the magnetic tape is erased in a state that an S-polarity or N-polarity magnetism of the direct current component remains thereon. Therefore, the magnetic tape has a reduced dynamic range so that there may be a case that the magnetic tape has distortions in recorded signals when the signal is recorded thereon in an overlapped manner.

Figure 5:
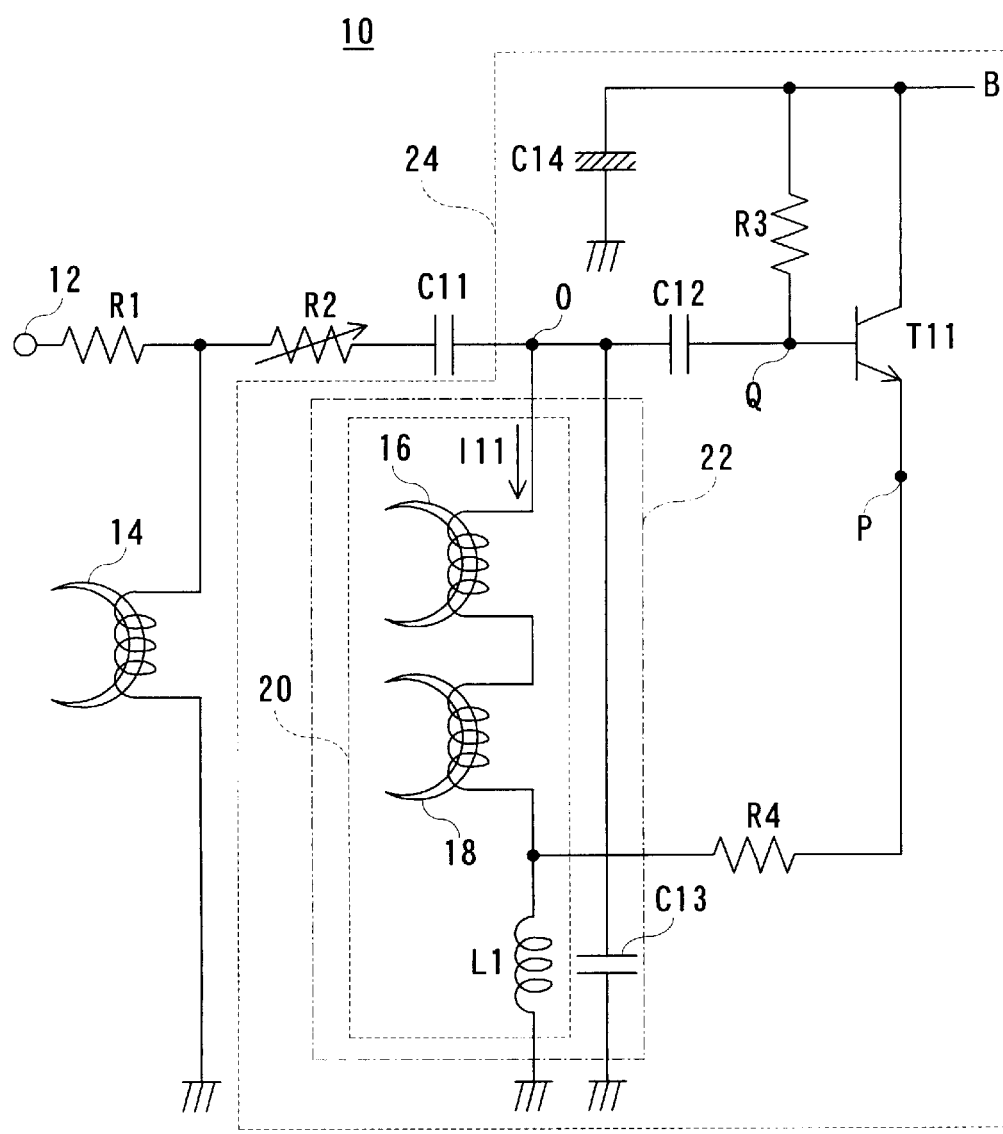
FIG. 5 is a circuit diagram showing another embodiment of this invention.

The distortion in the erasing current can be eliminated by another embodiment according to this invention as shown in FIG. 5. The FIG. 5 embodiment is the same as the FIG. 2 embodiment, except for the points given below. Accordingly, the same or similar components are denoted by a same reference symbol, to omit duplicated explanations. That is, the FIG. 5 embodiment has a series circuit configured by the entire-width erasing head 16, the linear erasing head 18 and the inductor L1. The entire-width erasing head 16 has one end connected to the capacitor C11, and the linear erasing head 18 and the inductor L1 has therebetween a series junction point connected to the emitter of the transistor T11 through the resistor R4. The other end of the inductor L1 is in ground.

In this embodiment, when the transistor T11 is driven, the oscillation circuit 24 operates and both the entire-width erasing head 16 and the linear erasing head 18 have a high frequency current I11 flowing therethrough. In an erase operation accordingly, the entire-width erasing head 16 causes erasure from the azimuth track, or the azimuth and linear recording tracks, while the linear erasing head 16 causes erasure from the linear recording track. Incidentally, because the emitter current of the transistor T11 flows through only the inductor L1 via the resistor R4, there is no possibility that the direct current component mixed in the emitter current is given onto the video tape during the erase operation. Also, the capacitor C12 serves to prevent the direct current given from the bias B through the resistor R3 from flowing through the LC resonant circuit 22.

Figure 6:
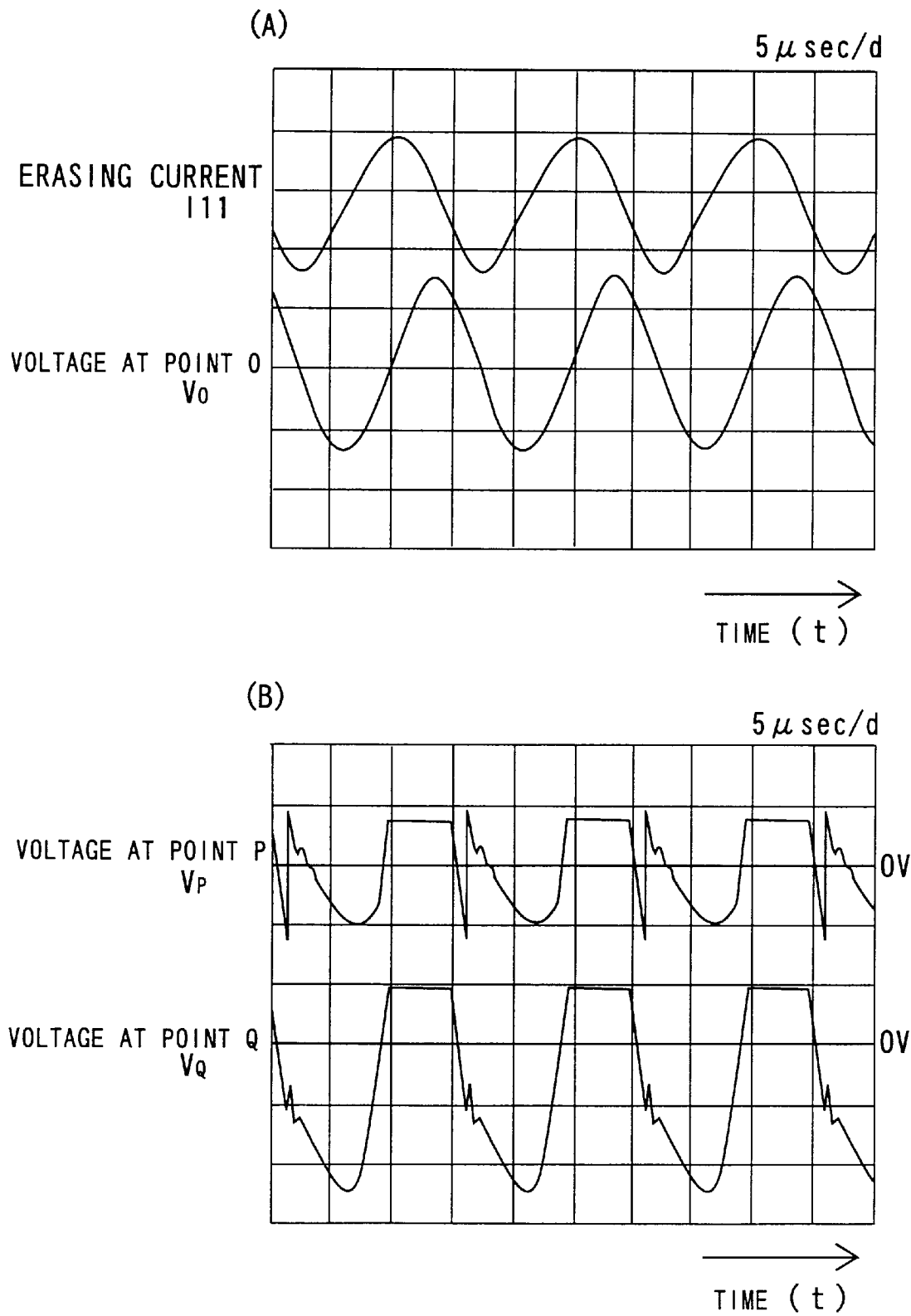

In the biasing/erasing oscillation circuit 10 for VTR (VCR) of this embodiment, characteristics as shown in FIG. 6(A) and FIG. 6(B) are provided. That is. FIG. 6(A) is a graph showing a variation, with respect to time, in the voltage $V_O$ at a point O (voltage given to the LC resonant circuit 22) and the erasing current I11 flowing through the series circuit 20. FIG. 6(B) is a graph showing the variation, with respect to time, in the voltage $V_P$ at a point P and the voltage $V_Q$ at a point Q through which the erasing current I11 is flowing. As shown in FIG. 6(A), the erasing current I11 is free of such distortions that are encountered in the erasing current I2 flowing through the sound erasing head 3 in the conventional biasing/erasing oscillation circuit 1 shown in FIG. 4. Since in FIG. 6(A) and FIG. 6(B) the horizontal scale has a unit division denoting 5 $\mu$ sec. (5 $\mu$ sec./d), one period can be read as approximately 15 $\mu$ sec. Accordingly, the erasing current I11 has a frequency of approximately 70 kHz when the oscillation circuit 24 is oscillating.

Meanwhile, the erasing current I11, when measured by a distortion meter (not shown), has a measured value of 2 percent. Therefore, improvement has been made against distortions as compared to the erasing current I2 of the biasing/erasing oscillation circuit (FIG. 2) having a distortion meter measurement value of 5–17 percent.

According to the FIG. 5 embodiment, the entire-width erasing head 16 and the sound erasing head 18 are utilized as an oscillating element, thereby reducing the price.

Moreover, since direct current from the bias B is blocked by the capacitor C12 and the emitter current of the transistor T11 is allowed to flow through the inductor L1, the erasing current is prevented from generating distortion therein. Therefore, when signals are recorded in an overlapped manner on the video tape, distortion components contained in the recording signals are reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A biasing/erasing oscillator in a magnetic tape recording apparatus having an entire width erasing head for erasing signals recorded in an azimuth track, or the azimuth track and a linear track, of a magnetic tape, and a linear record erasing head for erasing signals recorded in the linear track of the magnetic tape, comprising:

a series circuit connecting in series through a series junction point at least between said linear record erasing head and one of said entire-width erasing head and an inductance element;

an oscillating capacitor connected in parallel with said series circuit;

a transistor having a collector and a base and having an emitter connected to said series junction point;

a direct current blocking capacitor connected between one end of said series circuit and said base; and a bias resistor for providing a bias voltage to said base.

2. An oscillator according to claim 1, wherein said inductance element is a remaining one of said entire-width erasing head and said linear record erasing head.

3. An oscillator according to claim 1, wherein said inductance element is an inductor.

4. An oscillator according to claim 3, wherein said series circuit includes two erasing heads of said entire-width erasing head and said linear record erasing head and said inductor, said series junction point is a junction point between said two erasing heads and said inductor.

5. A biasing/erasing oscillator in a magnetic tape recording apparatus having an entire width erasing head for erasing signals recorded in an azimuth track, or the azimuth track and a linear track, of a magnetic tape, and a linear record erasing head for erasing signals recorded in the linear track of the magnetic tape, comprising:

a series circuit connecting in series through a series junction point said entire-width erasing head and said linear record erasing head;

an oscillating capacitor connected in parallel with said series circuit;

a transistor having a collector and a base and having an emitter connected to said series junction point;

a direct current blocking capacitor connected between one end of said series circuit and said base; and biasing means providing a bias voltage to said base.

6. A biasing/erasing oscillator in a magnetic tape recording apparatus having an entire width erasing head for erasing signals recorded in an azimuth track, or the azimuth track and a linear track, of a magnetic tape, and a linear record erasing head for erasing signals recorded in the linear track of the magnetic tape, comprising:

an inductance element;

a series circuit connecting in series through a series said entire-width erasing head, said linear record erasing head and said inductance element;

an oscillating capacitor connected in parallel with said series circuit;

a transistor having a collector and a base and having an emitter connected to a junction point connecting said inductance element and said linear record erasing head;

a direct current blocking capacitor connected between one end of said series circuit and said base; and biasing means for providing a bias voltage to said base.

* * * * *

(12) EX PARTE REEXAMINATION CERTIFICATE (7131st)
United States Patent
Higuchii

(10) Number: US 6,064,538 C1
(45) Certificate Issued: Nov. 3, 2009

(54) BIASING/ERASING OSCILLATION CIRCUIT FOR MAGNETIC TAPE RECORDING APPARATUS

(75) Inventor: Yoshio Higuchii, Daito (JP)

(73) Assignee: Funai Electric Co., Ltd., Nakagaito Daito-Shi, Osaka (JP)

Reexamination Request:
No. 90/009,429, Apr. 27, 2009

Reexamination Certificate for:
Patent No.: 6,064,538
Issued: May 16, 2000
Appl. No.: 09/024,771
Filed: Feb. 17, 1998

(30) Foreign Application Priority Data

Feb. 17, 1997 (JP) ............................................. 9-031530
Sep. 30, 1997 (JP) ............................................. 9-265894
Feb. 10, 1998 (JP) ........................................... 10-028287

(51) Int. Cl.
*G09B 15/016* (2006.01)
*G09B 15/017* (2006.01)
*G09B 5/175* (2006.01)

(52) U.S. Cl. ........................... 360/64; 360/271.1; 360/53
(58) Field of Classification Search ...................... 360/66
See application file for complete search history.

(56) References Cited

U.S. PATENT DOCUMENTS

| 4,012,701 A | 3/1977 | Sugimoto et al. |
| 6,064,538 A | 5/2000 | Higuchii |

FOREIGN PATENT DOCUMENTS

| JP | S58-125203 | 7/1983 |
| JP | S61-153102 | 9/1986 |

OTHER PUBLICATIONS

Marvin Carmas, Magnetic Recording Handbook, 1988, pp. 289–292, Van Nostrand Reinhold Company Inc., New York, NY, United States.
Howard W. Sams & Company, VCRfacts Technical Service Data for Emerson Model VCR953, Mar. 1995, pp. 1–4.
Howard W. Sams & Company, VCRfacts Technical Service Data for Fisher Model FVH–960, Sep. 1995, pp. 1–6.
Joseph J. Carr, Secrets of RF Circuit Design, 1996, pp. 251–260, Tab Books, United States.
Howard W. Sams & Company, Servicing Data for Magnavox VH 8200BR01, 1978, pp. 5, 100–115, Indianapolis, IN, United States.
Howard W. Sams & Company, 1995 Annual Index, 1995, pp. 2–4, 284–286.
Howard W. Sams & Company, 1996 Annual Index, 1996, pp. 4, 293–295.
Trial Transcript in *Funai Electronics Co., Ltd.* v. *Daewoo Electronics America Inc., et al.* Case No. 3:04–cv–1830–JCS.

*Primary Examiner*—Pia Tibbits

(57) ABSTRACT

A biasing/erasing oscillator includes a series circuit formed by an entire-width erasing head, a linear record erasing head and an inductor. The series circuit is connected in parallel with an oscillating capacitor to form an LC resonant circuit. The LC resonant circuit is connected to a base of a transistor through a direct current blocking capacitor. The transistor has an emitter is connected to a series junction point, for example, between a sound erasing head and the inductor. A collector of the transistor is supplied with a bias voltage, while the transistor base is supplied with a bias current through a bias resistor. The direct current blocking capacitor prevents the bias current from flowing into the LC resonant circuit.

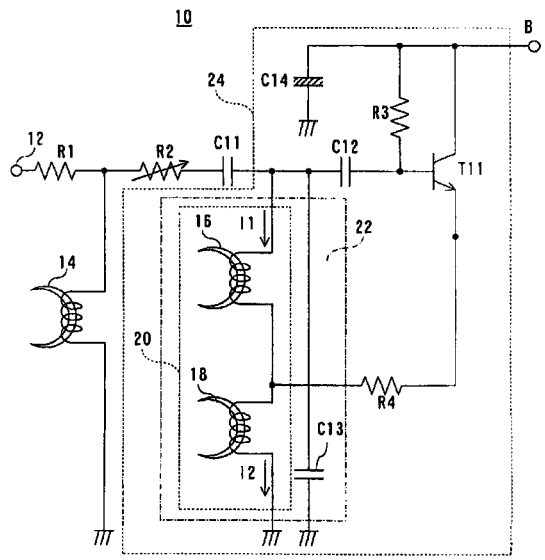

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

Claim 6 was not reexamined.

* * * * *